United States Patent
Kokanovic

(10) Patent No.: US 11,291,162 B2
(45) Date of Patent: Apr. 5, 2022

(54) PNEUMATIC CUSHIONS FOR SOFT RECEPTION OF HARVESTED FRUIT ON MECHANIZED FRUIT HARVESTING DEVICES

(71) Applicant: Momcilo Kokanovic, Obrenovac (RS)

(72) Inventor: Momcilo Kokanovic, Obrenovac (RS)

( * ) Notice: Subject to any disclaimer, the term of this patent is extended or adjusted under 35 U.S.C. 154(b) by 59 days.

(21) Appl. No.: 16/639,937

(22) PCT Filed: Jul. 2, 2018

(86) PCT No.: PCT/RS2018/000008
§ 371 (c)(1),
(2) Date: Feb. 18, 2020

(87) PCT Pub. No.: WO2019/009746
PCT Pub. Date: Jan. 10, 2019

(65) Prior Publication Data
US 2020/0253122 A1    Aug. 13, 2020

(30) Foreign Application Priority Data

Jul. 3, 2017    (RS) .................................. P-2015/0673

(51) Int. Cl.
*A01D 46/26*    (2006.01)

(52) U.S. Cl.
CPC ........ *A01D 46/26* (2013.01); *A01D 2046/262* (2013.01)

(58) Field of Classification Search
CPC ............... A01D 46/26; A01D 2046/262; A01D 46/253; A01D 46/28
See application file for complete search history.

(56) References Cited

U.S. PATENT DOCUMENTS

| | | | | |
|---|---|---|---|---|
| 3,535,864 A | * | 10/1970 | Smith .................... | A01D 46/26 56/329 |
| 5,259,177 A | * | 11/1993 | Windemuller ........ | A01D 46/285 56/12.8 |
| 5,647,194 A | * | 7/1997 | Scott ...................... | A01D 46/28 56/328.1 |
| 8,117,814 B2 | * | 2/2012 | Sidhu ..................... | A01D 46/28 56/329 |
| 9,497,902 B2 | * | 11/2016 | Marrs ................... | A01D 46/285 |
| 10,595,461 B2 | * | 3/2020 | Irarrazaval ............ | A01D 46/28 |
| 2014/0250853 A1 | * | 9/2014 | Young ..................... | A01D 46/26 56/329 |
| 2017/0238465 A1 | * | 8/2017 | Bodtke .................. | A01D 46/28 |

* cited by examiner

*Primary Examiner* — Alicia Torres
*Assistant Examiner* — Matthew Ian Neal
(74) *Attorney, Agent, or Firm* — William D. Hare, Esq.; McNeely, Hare & War, LLP

(57) ABSTRACT

Pneumatic cushions for soft reception of harvested fruit on mechanized fruit harvesters, comprise an assembly that includes a reception tray and a rubber membrane, wherein the whole assembly has a polygonal shape. The rubber membrane is stretched over the upper side and side edges of the reception tray, and attached to the side surfaces of the tray. The membrane is glued around the entire side perimeter of the tray and may be secured by means of a safety tape. On the part opposite to the sides, on the bottom of the tray, are fitted blow-holes for release of air from underneath the membrane. On the corner of the tray, formed by sides, is fitted a mechanism for revolving connection of the tray to the support and to air supply pipe.

14 Claims, 5 Drawing Sheets

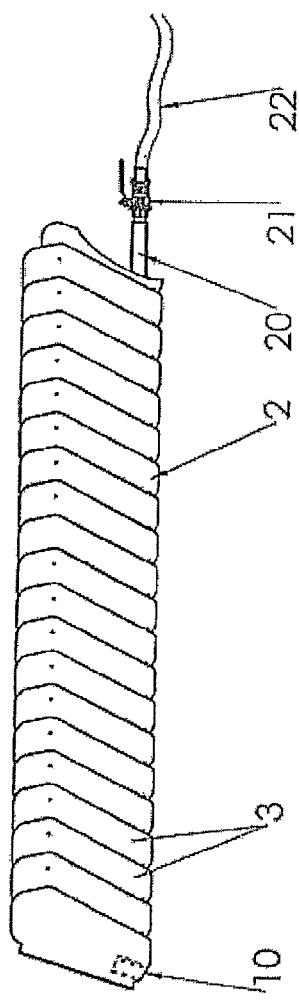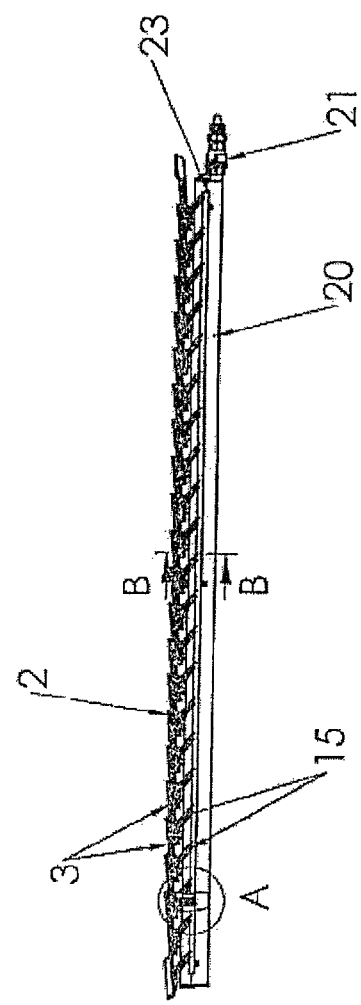
Figure 2
Figure 3

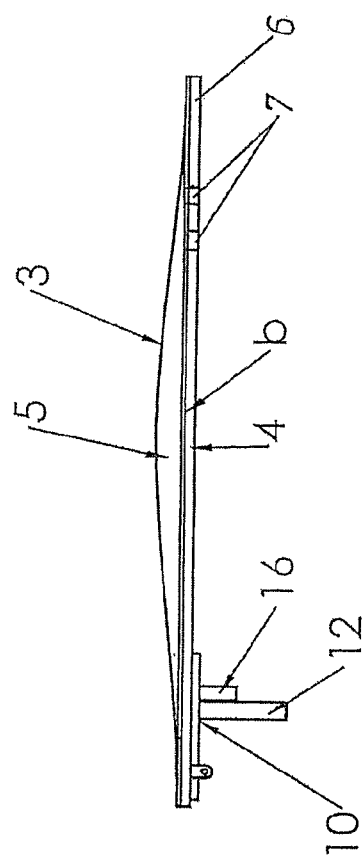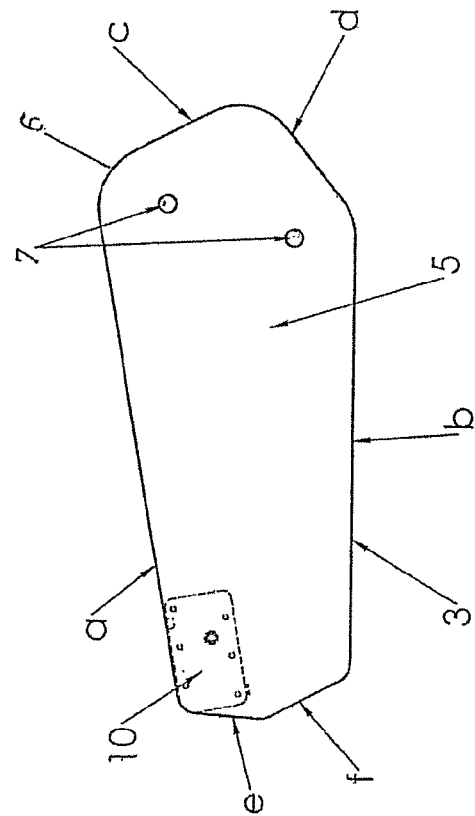
Figure 6       Figure 5
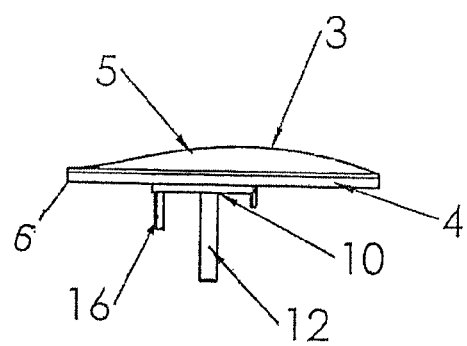
Figure 7

PNEUMATIC CUSHIONS FOR SOFT RECEPTION OF HARVESTED FRUIT ON MECHANIZED FRUIT HARVESTING DEVICES

TECHNICAL FIELD OF THE INVENTION

The invention relates to the field of agriculture in general and more closely to the field of harvest and harvesters or lawn, cereals and other crops mowers.

In keeping with the international patent classification (IPC[15]), the invention may be designated and classified under the following classification symbols: A 01 D 46/253, which refers to harvesting of fruits, vegetables, hops or the like, using devices for shaking trees or shrubs, and more specifically to portable motorized fruit harvesters and harvesting or picking of agricultural crops on stem, A 01 D 46/26, which refers to devices for shaking trees or shrubs and associated fruit collecting devices, and A 01 D 46/28, which refers to vintage devices.

TECHNICAL PROBLEM

The technical problem resolved by the pertinent invention consists of the following: the design solution of pneumatic cushions for soft reception of harvested fruit on mechanized fruit harvesting devices, enabling an efficient harvesting of fruit (raspberries, blueberries, blackberries, red currant, etc.) without physical contact and damages, featuring pneumatic cushions designed as reception trays covered with rubber lining and with air under pressure pumped in between (air inlet on one side and air outlet on the other side of the trays), allowing for a soft reception of harvested fruit, so the pneumatic cushion would not cause any internal or external damage to fruit, it would be of easy and light construction, functional, practical and easy to use, durable and economically viable and at the same time ecologically safe.

BACKGROUND ART

Soft fruit, as a common name for the garden strawberry (*Fragaria elatior*), the raspberry (*Rubus idaeus*), the blackberry (*Rubus fruticosus*) and similar fruit, belongs to the family of rosaceae and grows in the form of bushes or shrubs with long thin branches. Soft fruit is nowadays widely appreciated and cultivated on fields and plantations, and the harvest of this very sensitive product is carried out mostly by hand. Also, the current requirements of fruit harvesting are more stringent than before, both in terms of harvesting speed, hygiene and other requirements set by the International Food Quality standard—HACCAP (Hazard Analysis and Critical Control Points).

Basically, there are two commonly known fruit harvesting or fruit picking modes: manual picking with or without picking tools, and harvesting by means of devices for shaking trees or shrubs. Harvesting with devices for shaking trees or shrubs can be pneumatically, mechanically, by means of portable motorized fruit harvesters, or by means of specialized vintage devices, and all of them feature particular fruit reception devices that can be used separately or along with harvesting—shaking devices.

There are specialized devices for harvesting—shaking berries—Rolend raspberries, featuring a technology that presents numerous advantages compared to other mechanized modes of harvesting berries (which generally use plastic sticks for shaking fruit from tree tops). There is a wide range of devices for harvesting strawberries, raspberries, red current, blueberries and similar fruit. Berries picked by air blast harvesting devices, for the purpose of deep-freezing, present no visible damages and may therefore be classified as first class product or produce. However, when harvested for fresh consumption, the contact of soft fruit with plastic reception trays in the air tunnel causes internal and external contusions which speeds up decay and softening of fruit, making it impossible to be preserved long enough at ambient temperature.

In line with the actual state of the technical field in the inventors' country and through research of the national patent documents database, several approved patent solutions and patent applications have been found in the pertinent technical field, which are more or less related to the object of this patent application. Some of them will be described in the following text.

A commonly known solution, registered as a national Serbian patent under number 52879B and designated as "Harvester for raspberries and blackberries", describes a device designed for harvesting raspberries and blackberries which consists of a stationary part and movable components of the frame, with a front wheel resting on the ground. The frame supports an internal combustion engine, a tank for liquid fuel and a gas bottle, as well as the systems for shaking and transport of fruit to the packaging area, preceded by a cleaning system. Shaking fruit from shrubs is carried out by a shaking mechanism, which drives bunches of elastic sticks used for shaking fruit. Fruit is driven through diverters towards the conveyor belts, from where they fall directly into manually positioned packaging or packages. The conveyor belts are designed with perforations provided to let through the air blown by the fan, separating dirt from fruit and driving it away through dedicated channels to the atmosphere. The engine drives the hydraulic pumps, which in turn drive hydraulic motors which power at the same time the fans and the conveyor belts, as well as the hydraulic motors activating the shaking mechanisms. The hydraulic pump directs oil though a distribution valve towards corresponding hydraulic cylinders in order to level the device. A steering gear connected to a hydraulic cylinder is provided for steering the harvester through the crops.

Another solution is registered as a Serbian national patent under number 488MP, entitled as "Towed soft fruit harvesting device", intended particularly for use on raspberry and blueberry farms, and a device installed on a towed trailer is designed to be powered by any tractor or rotary cultivator with 11 kW of power or more. The invention consists of a suction hood installed on a dispensing hopper whose inlet is connected to a centrifugal fan through a channel. The fan is in turn attached to a discharge hood extending to a flow channel narrowed at the end and reaching over the suction inlet of the hood. A flap with a counter-balancing weight is attached under the dispensing hopper. The operating principle is based on the high speed flow of air around the fruits on the plant. Fruits are blown off by means of the combined effect of forces generated by the discharge hood, the suction hood and the force of gravity. Fruits are then transported to the casing by means of the vacuum, while dry thorn leaves and branches are blown away by the fan through the channel and the outlet on the hood. The harvester is operated by two operators: the driver and the worker in charge of replacement of crates. The patent registered under number YU-314 MP describes and presents the device for harvesting strawberries and clearing grass in strawberry fields by means of a seat sliding on a rail. The invention consists of a frame with profiled wheels moving along a rail. Between the wheels, a spindle is installed on the frame over threaded sockets, featuring a handle provided for rotating the spindle. A crate-holding basket is overhanging on the top front part of the frame, while an operator seat is fixed on top and in the middle of the frame. The operator is moving together with the frame along the rail, picking strawberries by hand and putting them into a crate.

The patent registered under number YU 47636 describes a fruit harvesting device attached to a standard tractor over the connection points on its lattice structure with wheels moving along a rail. Between the wheels, a spindle is installed on the frame over threaded sockets, featuring a handle provided for rotating the spindle. A crate-holding basket is overhanging on the top front part of the frame, while an operator seat is fixed of top and in the middle of the frame. The operator moves together with the frame along the rail, picking strawberries by hand and putting them into a crate.

The patent registered under number YU 47636 describes a fruit harvesting device attached to a standard tractor over the connection points on its lattice structure. It is designed exclusively for fruit harvesting by shaking trees and collecting, treating and filling packaging with fruit and laying them on the ground during shaking. The structure includes, in the box girder, in front and behind the tractor, a mechanical arm configured in the form of a parallelogram with pairs of bars, then a flexibly connected bucket with a conveyor belt tilted towards the additional transporter hanging on chains under the console, and the claw head of the shaker installed on the lattice girder.

The fruit shaking and collecting device, presented in the national patent registered under number YU 47590, is designed as a unit attached to a tractor, featuring a semi-cabin with a canopy attached by means of bolts. The semi-cabin exhibits a lattice structure and includes a basic frame and a split frame which are interconnected, as well as a canopy holder, while the rear part of the semi-cabin carries a bracket for packaging provided with a vertically moving frame with forks for reception of pallets. The construction includes a transporter with angular displacement and with mechanical arms over a telescopic tube, a head used for shaking hung over pulleys, and hydraulic cylinders mounted on the front part of the supporting structure.

A fruit combine harvester, used primarily for shaking, collecting and treating fruit, registered as a national patent under number YU 47246, is attached to a standard tractor with an integrated hydraulic pump, fan with nozzle and crate holder. The combine harvester includes a forklift frame with a mechanical arm trolley and flexibly connected parallelogram frames supporting a bucket with a shaking head and connected sticks in the form of a half-umbrella. The combine harvester supporting frame also carries a vertically movable trolley with wheels connected by means of slideways, with the upper axle of the trolley attached by means of a steel rope to the hydraulic cylinder rod, while the other end of the rope is attached to the bottom of the cylinder on the frame.

The patent registered under number YU 65MP describes a packaging carrier for manual fruit harvesting, which provides for manually picked fruit to be stored directly from the hand of the picker on the bottom of the packaging or on top of fruit already laid down in the packaging, avoiding therefore fruit to be crashed against each other and hence damaged. The carrier includes vertically positioned sticks and a horizontal element, which are interconnected by means of a cranked link, while the vertical sticks support a board with slots housing the ends of the belt. The harnesses are attached to the upper ends of vertical sticks, while the clamps are drawn on and attached to their lower ends. The horizontal part includes horizontal sticks supporting planks intended for carrying the crates.

The national patent application published under number YU P-16/96 describes a patent named "Fruit harvesting mechanical arm", which includes a head installed on a long bar, allowing the operator to reach the branch from which one wishes to pick fruit. By lifting the branch with the holder and by simultaneously pulling off the cable, the casing slides downwards dragging a toothed comb. The comb catches the fruit between its teeth and takes it off, and the fruit falls directly into a bag. By loosening the cable, the spring brings the bag with the comb back to the initial position, so the action can be repeated.

The purpose of the instant invention is to remedy the shortcomings of the known solutions, since the analysis of the background art and the technical solutions stated above make it obvious that some of the solutions are characterized by a very complex design and are complicated to use and maintain, which in turn results in high manufacturing costs. Besides, most of these solutions base their operation on the principle of shaking fruit trees, or improving and facilitating manual harvesting of fruit, which is extremely slow. Furthermore, the main shortcoming of these solutions lies in the fact that none of them provides for soft reception of harvested fruit, in other words all these solutions, during harvesting, lead to external and internal damages of harvested fruit, reducing significantly the lifetime of the product, particularly of fruit intended for fresh consumption.

Also, through the analysis of shortcomings present in solutions described in the background art described above, the inventor came up with an innovative solution to the actual technical problem, which will be described in detail in the following text and illustrated in the figures.

DISCLOSURE OF THE INVENTION

Air blast soft fruit harvesting devices, featuring air blast harvesting technology which presents numerous advantages compared to other mechanized fruit harvesting devices (using plastic sticks for shaking fruit from tree tops), provide easy harvesting of soft fruit without physical contact and damage to the fruit. Fruit harvested by air blast devices, for the purpose of deep-freezing, present no visible damages and may therefore be classified as first class product or produce. However, when harvested for fresh consumption, the contact of soft fruit with plastic reception trays in the air tunnel causes internal and external contusions which speeds up decay and softens the fruit, making it impossible to be preserved long enough on ambient temperature. Since the only contact with fruit during harvesting (carried out through air blasts) occurs at the level of reception trays, the idea of the inventor was to cover the trays with soft, food-grade rubber material with permanent air flow underneath, under pressure (air inlet on one side and air outlet on the other side of the tray), allowing that way a soft reception of harvested fruit to avoid any internal or external damage to fruit.

The invention refers to pneumatic cushions for soft reception of harvested fruit on mechanized fruit harvesters, designed to cushion the fall of soft fruit, wherein this assembly consists of a plastic reception tray and a rubber membrane, and the assembly takes the shape of a polygon. The rubber membrane, which is most preferably made of food-grade rubber, is laid over the upper side of the reception tray and glued around its entire perimeter, and secured by means of a safety tape, if necessary.

The rubber membrane is glued and secured by means of a safety tape around the entire perimeter of the tray. On one part of the side V and the side 'd', on the bottom of the tray, are fitted outlet ports for partial releasing of air from underneath the membrane. In the corner of the tray, at the junction of sides 'a' and 'e', has been installed a mechanism for revolving connection of the tray to the support and the air supply pipes, and the mechanism consists of an axle and a bushing with a hole.

The invention, according to this patent application, presents several advantages, and the most significant of them are the following:

pneumatic cushions achieve efficient and soft reception—fall of harvested fruit on reception trays;
no internal or external damage to fruit;
easy and light construction, functional, practical and easy to operate and maintain;
durable, economically viable and ecologically safe.

BRIEF DESCRIPTION OF THE DRAWINGS

For easier understanding of the invention and presenting the way it can be carried out in practice, the applicant refers to the figures attached hereinafter, namely:

FIG. 2 shows a bird's eye view of the pneumatic cushions assembly as per FIG. 1, shown in operating position;

FIG. 3 shows a side view of the pneumatic cushions assembly as per FIG. 2;

FIG. 5 shows a top view of the pneumatic cushions assembly as per FIG. 4;

FIG. 6 shows a front view of one pneumatic cushion as per FIG. 5;

FIG. 7 shows a side view of the pneumatic cushion as per FIG. 2;

DETAILED DESCRIPTION OF THE INVENTION

Figure 1:
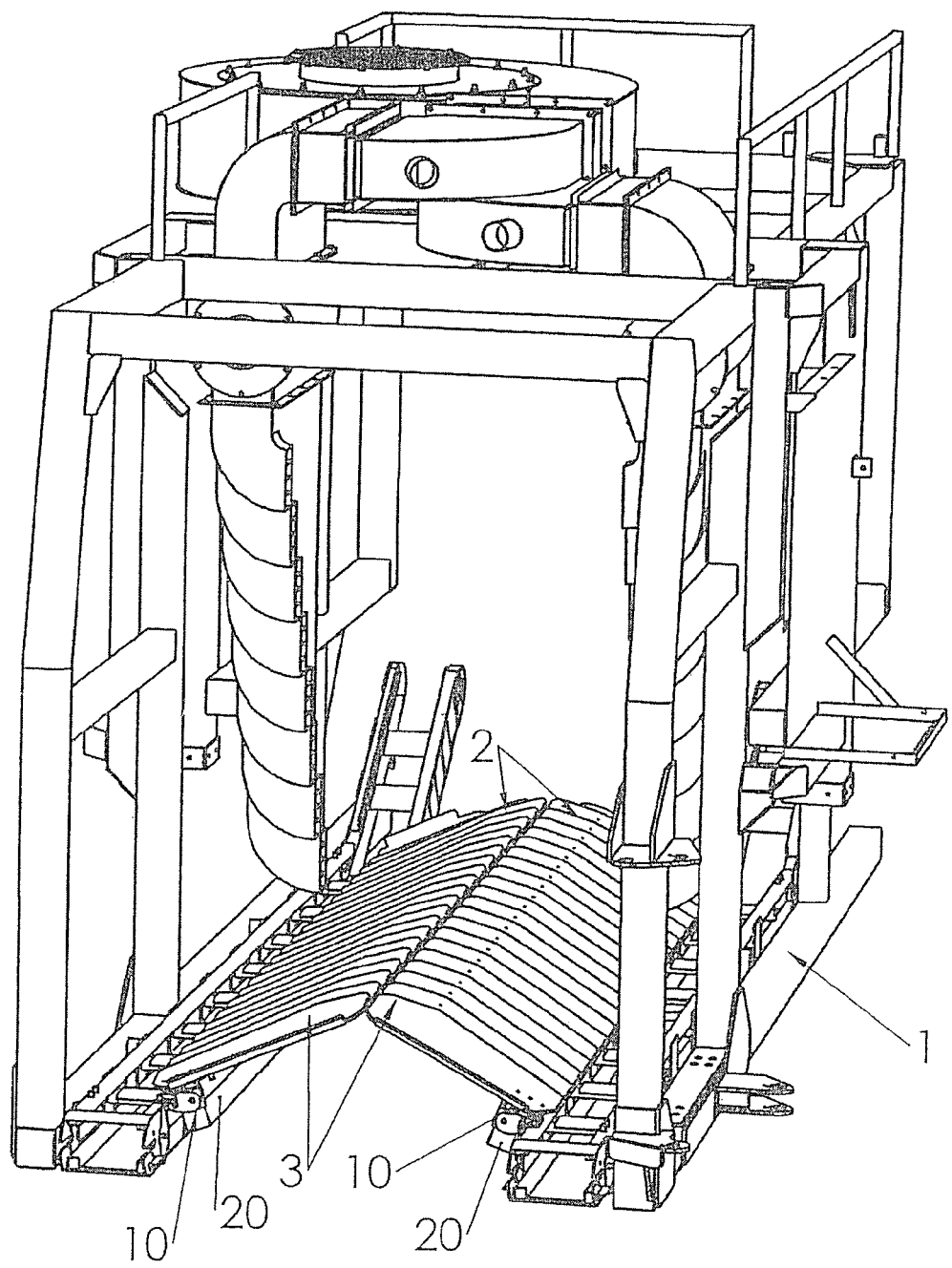
FIG. 1 shows an axonometric view of the air tunnel assembly on the harvester with pneumatic cushions for soft reception of harvested fruit on mechanized fruit harvesters, according to the invention.

The air blast harvesting device 1, of commonly known design, consists of two rows of assemblies 2, parallel to each other and partially overlapping, including a series of trays 4, FIG. 1, fitted lengthwise in the air tunnel of the harvester. The assembly 2 mentioned above including a series of plastic reception trays with pneumatic cushions of the harvester 1, designed for soft reception of harvested fruit (raspberries, blueberries, blackberries, red current, etc.), according to the invention and as per FIGS. 1 to 9, consists of a series of interconnected pneumatic cushions connected to an air supply pipe.

Figure 4:
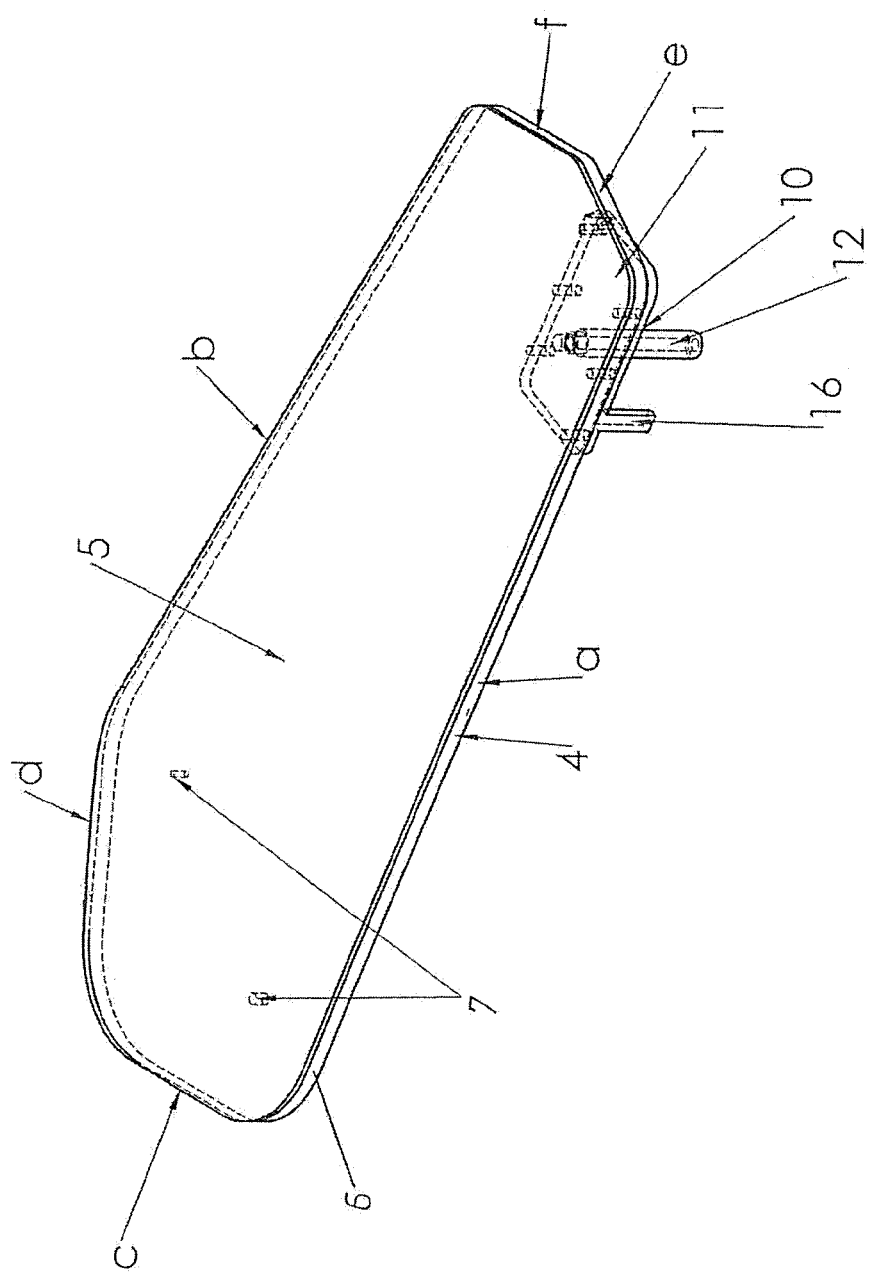
FIG. 4 shows an axonometric view of the pneumatic cushions assembly as per FIGS. 2 and 3.

The assembly 3, FIGS. 2 to 7, consists of a plastic reception tray 4 covered with a rubber membrane 5. Assembly 3 differs from assembly 2 by the addition of the rubber membrane 5. The assembly 3 has a polygonal shape with longer sides 'a' and 'b' positioned under acute angle to each other, while the couples of shorter sides, 'c' and 'd' and 'e' and 'f', form an obtuse angle between them. The rubber membrane 5, which is most preferably made of food-grade rubber and covers the upper side of the reception tray 4, is laid over the side edges of the tray, stretched and glued to the side of the tray 4. The membrane 5, FIG. 4, is glued around the entire side edge and secured by means of a safety tape 6, for improved safety and operating conditions. The safety tape 6 is fitted along the entire perimeter of the tray 4. On the lower side of the tray 4, are fitted blowholes 7 designed for releasing air from underneath the membrane 5, FIGS. 4, 5 and 6.

Figure 8:
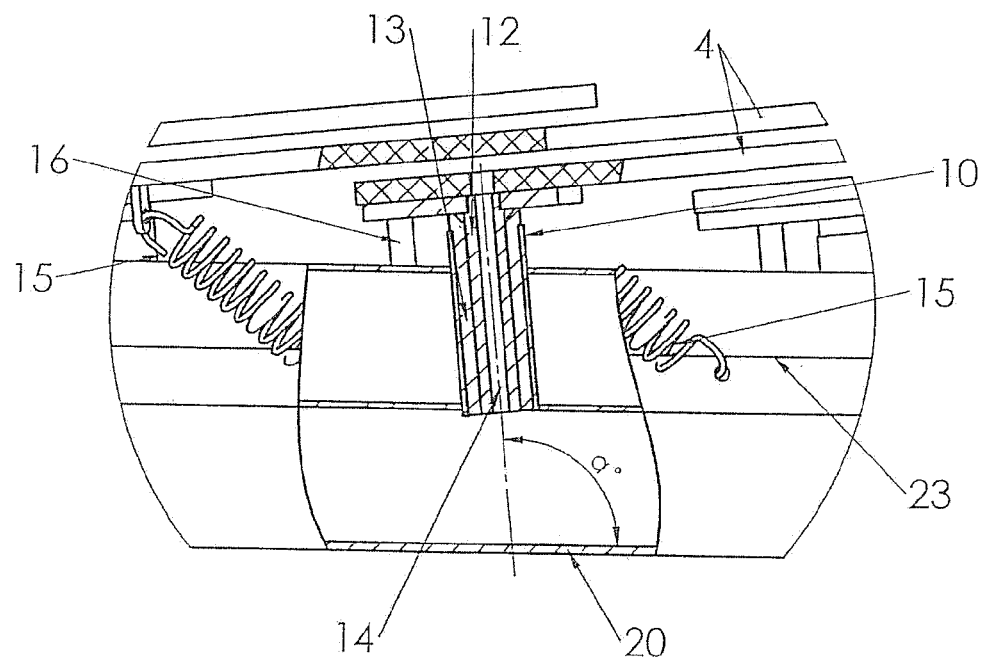
FIG. 8 shows a view of the mechanism assembly connecting the reception tray with revolving bushing to an air pipe (detail A of FIG. 3), on a larger scale and in partial cross section.
Figure 9:
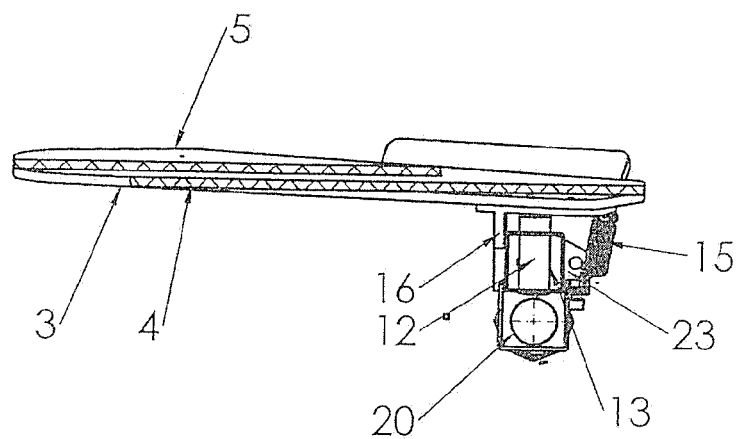
FIG. 9 shows a view of the assembly of the reception tray with revolving bushing and the air pipe (cross section line B-B of FIG. 3).

The assemblies 3, including a membrane 5 stretched over a plastic tray 4, are stacked on each other steplike with some overlapping, see FIGS. 2 and 3, including the mechanism 10 for revolving connection to the support 23 and to the air supply pipe 20. On one end of the air supply pipe 20 is fitted a valve 21 connected to a flexible hose 22, while the other end of the pipe 20 is sealed. The mechanism 10, allowing a free rotation of the assembly 3, see FIGS. 8 and 9, is fitted on the corner of the tray 4 formed by sides 'a' and 'e'. The mechanism 10 includes an upper plate 11 and the axle 12 of the reception tray is attached to the lower side of the plate, under the tray 4 and on it. The axle 12 of the tray 4, fitted by means of a revolving connection to a revolving bushing 13, features a central hole 14. The axle 12 with a revolving bushing 13 is attached to a support 23, with the lower part of the bushing 13 partially fit into the air supply pipe 20. The trays 4 with the axle 12 and the bushing 13 are attached at an angle 'a' to the support 23 and the air supply pipe 20. The central hole 14 connects the air supply pipe 20 to a space under the rubber membrane 5, allowing for pumping air under pressure into the space under the membrane (air inlet on one side and air outlet on the other side of the tray). It is important to note that the quantity of air pumped inside the membrane 5, more precisely between the tray 4 and the membrane 5, is larger than the quantity of air evacuated through the blow-holes 7. Therefore, air is permanently evacuated through the blow-holes 7 in a way to keep constant overpressure value on all trays during harvesting, thus creating a permanent soft and elastic rubber surface providing for a gentle reception of harvested fruit. The assembly 3 is attached to the support 23 by means of springs 15, allowing for radial mobility and spatial regulation of the assembly 3, while the limiter 16 confines this radial motion.

The operating mode of pneumatic cushions for soft reception of harvested fruit on mechanized fruit harvesters, intended to cushion the fall of harvested fruit, according to the invention, is simple and clearly described in the text above and in the accompanying figures, so it is not necessary to be described in particular.

INDUSTRIAL OR OTHER APPLICATIONS OF THE INVENTION

The application mode of the invention arises clearly from the text above, and the industrial application of the invention, according to the patent application, does not require any particular skills, instructions or experience for efficient use of this invention. Only skills pertinent to the covered technical field, required and sufficient for efficient use of this invention in keeping with the description given above, are common to any average expert. The inventor has taken care to test on a manufactured prototype all design and operating characteristics of the invention.

Also, any design improvement or modification to the above described pneumatic cushions assembly for soft reception of harvested fruit on mechanized fruit harvesters, aimed at operating improvements, shall be considered covered by this application.

The invention claimed is:

1. A pneumatic cushion for soft reception of harvested fruit on mechanized fruit harvesters comprising:
- an assembly (3) including a reception tray (4) and a rubber membrane (5) covering the reception tray (4), wherein the assembly (3) has a polygonal shape with a pair of longer sides (3a, 3b) positioned under acute angle to each other, and two pairs of shorter sides (3c, 3d) and (3e, 3f) positioned to form an obtuse angle between them, and the rubber membrane (5) being stretched over an upper edge of the reception tray (4) and glued thereon creating a space between the top of the reception tray (4) and the rubber membrane (5);
- an air supply pipe (20) connected to the assembly (3) configured to provide a flow of air under pressure in the space defined between the reception tray and the rubber membrane (5); and
- one or more blow-holes (7) formed on one or more of the sides and/or the bottom of the reception tray (4) for providing a flow of air from the space between the tray and the rubber membrane (5).

2. The pneumatic cushion for soft reception of harvested fruit on mechanized fruit harvesters, according to claim 1, further comprising a support (23) and a number of springs (15), the reception tray (4) mounted to the support (23), wherein the number of springs allow radial mobility of the reception tray (4).

3. The pneumatic cushion for soft reception of harvested fruit on mechanized fruit harvesters, according to claim 1, further comprising a valve (21) fitted to one end of the air supply pipe (20), the valve (21) connected to a flexible hose (22), other end of the air supply pipe (20) being sealed.

4. The pneumatic cushion for soft reception of harvested fruit on mechanized fruit harvesters, according to claim 2, further comprising a limiter (16) coupled to the support (23) to confine a radial motion of the reception tray (4).

5. The pneumatic cushion for soft reception of harvested fruit on mechanized fruit harvesters, according to claim 2, further comprising a mechanism (10) including an upper plate (11) and an axle (12) connected to a lower side of the upper plate (11) under the reception tray (4), wherein the axle (12) is fitted and rotates in a bushing (13), a lower part of the bushing (13) being fitted inside the air supply pipe (20) such that a central hole (14) of the axle (12) is connected to the air supply pipe (20), the axle (12) and the bushing (13) being fitted at an angle ($\alpha$) to the support (23) and the air supply pipe (20).

6. The pneumatic cushion for soft reception of harvested fruit on mechanized fruit harvesters, according to claim 5, further comprising two or more additional assemblies (3) mounted to the support (23) and stacked on each other steplike with a partial overlap.

7. The pneumatic cushion for soft reception of harvested fruit on mechanized fruit harvesters, according to claim 1, wherein the assembly is configured such that a quantity of air pumped into the space between the rubber membrane and the reception tray through the air supply pipe is greater than a quantity of air released through the blow-holes whereby the space between the rubber membrane and the reception tray is maintained under pressure.

8. A mechanical fruit harvester comprising at least one pneumatic cushion, the at least one pneumatic cushion comprising:
- a reception tray having a polygonal shape, an upper surface and an opposite, lower surface and a circumference being defined by a pair of longer sides and at least two pairs of shorter sides relative to a length of the pair of the longer sides, and having an upper circumferential edge;
- a rubber membrane, wherein the rubber membrane is positioned over the upper circumferential edge of the reception tray and adhered to one or more of the longer sides and the shorter sides; and
- an air supply pipe connected to the reception tray and terminating in an opening positioned in a space defined between the reception tray and the rubber membrane,
- wherein the reception tray includes one or more holes on one or more of the longer sides, the shorter sides and the lower surface,
- whereby the pneumatic cushion is configured to receive air through the air supply pipe to pressurize the space.

9. The mechanical fruit harvester of claim 8, wherein the rubber membrane is glued to the one or more of the longer sides and the shorter sides.

10. The mechanical fruit harvester of claim 8, wherein the tray has a polygonal shape and the pair of longer sides form an acute angle to each other and each of the at least two pairs of shorter sides are configured to form an obtuse angle.

11. The mechanical fruit harvester of claim 8, wherein the cushion is configured such that a quantity of air pumped into the space between the rubber membrane and the reception tray through the air supply pipe is greater than a quantity of air released through the one or more holes,
whereby the space between the rubber membrane and the reception tray is maintained under pressure during use.

12. The mechanical fruit harvester of claim 8, further comprising a valve fitted to one end of the air supply pipe, the valve connected to a hose and the other end of the air supply pipe being closed.

13. The mechanical fruit harvester of claim 8, further comprising two or more additional pneumatic cushions assemblies mounted to a support and stacked on each other steplike with a partial overlap.

14. A method of harvesting fruit, the method comprising using the mechanical fruit harvester of claim 8 with pressurized air being supplied to the space through the air supply pipe and air being released from the space through the one or more holes.

* * * * *